Patented June 4, 1935

2,003,849

UNITED STATES PATENT OFFICE 2,003,849

COLORED GRANULE

William H. Alton, New York, N. Y., assignor to R. T. Vanderbilt Company, Incorporated, New York, N. Y., a corporation of New York No Drawing. Application September 14, 1932, Serial No. 633,078

6 Claims. (Cl. 91—70)

This invention relates to new colored granules suitable for various decorative purposes and includes both the new product and the method of producing it.

Various methods of coloring granular inert bases to produce colored granules for ornamental purposes have been proposed. Most of these and particularly those which have been utilized commercially involve coating the granules and then roasting them to fuse the coating and produce a weatherproof product, that is, a product which on exposure to the elements for a prolonged period of time retains decorative properties. The granules of this invention are not subjected to high temperatures such as are required for fusing or roasting and may therefore be prepared at a much lower cost and in very inexpensive equipment. Various waste materials and other products may be used as the base to be colored and since all the raw materials utilized are readily available and inexpensive, with the possible exception of the pigments used, the product may be quite inexpensively prepared, and for this and other reasons is to be preferred for many purposes.

According to this invention an inert base material is coated with a siliceous covering and an artificial coloring material to give a product suitable for application to asphalt shingles or other roofing, for bordering gardens, for admixture with concrete, plaster, etc. for the manufacture of garden furniture, etc., and for many outdoor uses where an inexpensive colored decorative granule is desired.

Various substances may be employed as the base to be coated, such as sand, crushed slate, stone and other naturally occurring mineral matter. The waste tailings from quarries such as granite quarries and washeries where china clay, etc. are prepared may advantageously be used. The waste from mica production, slag (artificial or natural), tiff from lithopone manufacture, etc. may be employed. Although I prefer to use an inert mineral base, such inert material as sawdust, wood shavings, etc. may be utilized. Granules of various sizes may be employed although for most purposes it is preferred to screen out granules of relatively uniform dimensions to be coated.

I prefer to color the granules with inorganic pigments such as chrome-green, chromic oxide, cadmium yellow and cadmium red, Krebs' pigment, etc. The granules may be colored white by the use of titanium oxide or white zinc compounds. The pigments employed should be resistant to the alkaline bath employed in coating the granules. Organic coloring matter may be utilized for some purposes but in general, organic pigments are not as permanent in color when exposed to weather conditions as the usual inorganic pigments used for such purposes.

In forming the colored granules, the inert base is coated with a siliceous coating, preferably by precipitating an insoluble salt of silicic acid onto the base from an alkali silicate solution. Solutions of potassium and sodium silicate and particularly ordinary water glass are preferred for this purpose. The siliceous coating may also be produced by coagulating a silicate solution by the addition of an acid such as hydrochloric acid or other suitable electrolyte. I prefer to precipitate the coating from solution by the use of a salt of a metal which forms a silicate less soluble than the alkali silicates and therefore precipitates a siliceous coating on the base. Such salts as calcium chloride, copper salts, etc. may be employed. The coated granules, preferably after washing, are then dried. The coloring matter may be incorporated into the granule in any suitable manner as by mixing with the granules before bringing them into contact with the silicate or by first mixing with the silicate or in any other suitable way to produce the desired effect.

In order to give body to the coloring matter, I prefer to add extending agents such as whiting or silicates to the coating, to give the color of the coating the proper covering properties.

According to a preferred method of carrying out the process, coloring matter and the silicate solution are first ground together. A ball mill may advantageously be employed for this purpose. Then the granules are mixed into the resulting solution or suspension. To precipitate or coagulate the silicate, the mass is then advantageously introduced into a suitable electrolyte, preferably in a tank equipped with agitating means.

For example, I may mix 60 pounds of 39° Baumé water glass, 20 pounds of chromium green and 44 pounds of whiting in a ball mill. When thoroughly ground together I put into 100 pounds of the mixture 1375 pounds of calcium carbonate granules of such size that all pass through a 10 mesh screen but are retained on a 40 mesh screen. The granules and coating materials are mixed for 10 minutes. They are then turned into a tank containing 1142 pounds of 18° Baumé calcium chloride. After remaining for about an hour with suitable agitation, the silicate will have become precipitated onto the granules and the chloride solution may be drained or filtered off. The coated granules are then washed with perhaps three successive washings of clear water. The resulting coated granules are then dried without roasting, for example by exposure to the air or by heating to a temperature of for example 100° C. As it is the object of this invention to produce inexpensive granules, I intentionally avoid fusing the coating which would involve heating costs and the cost of the necessary equipment and upkeep. The dried product is weatherproof and may be used for outdoor decorative purposes.

Instead of coating individual granules, the process may be applied to the agglomeration of fine particles such as sawdust or ground cork to give artificially colored, siliceous-coated agglomerates.

I claim:

1. In a method of coating granules of inert material with a solution of a substance capable of reacting with a soluble salt to form an insoluble silicate and thereafter treating the granules thus coated with a soluble salt in solution to cause the precipitation on the granules of an insoluble silicate coating; the step of washing the granules after the precipitation of the insoluble silicate coating to remove soluble salts.

2. In a method of coating granules of inert material with a solution of a silicate and thereafter treating the granules thus coated with a soluble chloride in solution to cause a precipitation on the granules of an insoluble silicate coating, the steps of washing the granules after the precipitation of the insoluble silicate coating to remove soluble salts and then drying the granules without roasting.

3. In a method of coating granules of inert material with a solution of a salt capable of reacting to form an insoluble silicate and thereafter treating the granules thus coated with a solution of a reagent capable of reacting with the salt of said first solution to precipitate an insoluble silicate coating on the granule, and which contains added coloring matter; the step of washing the granules after the precipitation thereon of the insoluble silicate coating to remove soluble salts to an extent such that the granules when exposed to the weather will not effloresce.

4. In a method of coating granules of inert material with a solution of a salt capable of reacting to form an insoluble silicate and thereafter treating the granules thus coated with a solution of a reagent capable of reacting with the salt of said first solution to precipitate an insoluble silicate coating on the granule, and which contains added white pigment; the step of washing the granules after the precipitation thereon of the insoluble silicate coating to remove soluble salts to an extent such that the granules when exposed to the weather will not effloresce.

5. A granule coated according to the method set forth in claim 1.

6. A colored granule made in accordance with the method set forth in claim 3.

WILLIAM H. ALTON.